Figure 1:
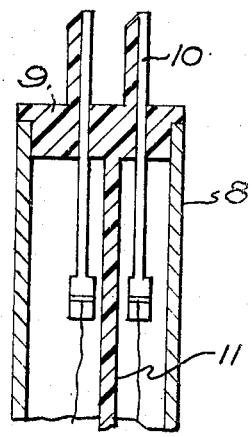

United States Patent [19]
Coe

[11] 3,709,040
[45] Jan. 9, 1973

[54] LANCES FOR TAKING SAMPLES OF MOLTEN METAL
[75] Inventor: Charles David Coe, Dronfield, Sheffield, England
[73] Assignee: Land Pyrometers Limited
[22] Filed: Nov. 17, 1970
[21] Appl. No.: 90,291

[30] Foreign Application Priority Data
Nov. 28, 1969 Great Britain......................58,274/69

[52] U.S. Cl.....................73/354, 73/17 R, 73/DIG. 9
[51] Int. Cl...........................G01n 25/04, G01k 1/14
[58] Field of Search.....73/17 R, 354, DIG. 9; 266/43

[56] References Cited

UNITED STATES PATENTS 3,369,406   2/1968   Lowdermilk......................73/DIG. 9
3,455,164   7/1969   Boyle....................................73/354
3,267,732   8/1966   Hance..................................73/17 R
3,481,201   12/1969  Falk......................................73/354

Primary Examiner—Louis R. Prince
Assistant Examiner—Denis E. Corr
Attorney—Lowe & King

[57] ABSTRACT

A lance for taking a sample of molten metal comprising an outer-housing or elongated holder tube, a metal mould set at one end of the housing or holder tube, there being at least one opening in the housing or holder tube adjacent an opening in the mould to allow molten metal to flow into the mould when the lance is immersed in molten metal, a refractory lining to the mould, and temperature-sensing means within the mould adapted to record the liquidus arrest temperature of the sample within the mould.

2 Claims, 3 Drawing Figures

INVENTOR,
CHARLES DAVID COE
BY Lours & King
ATTORNEYS

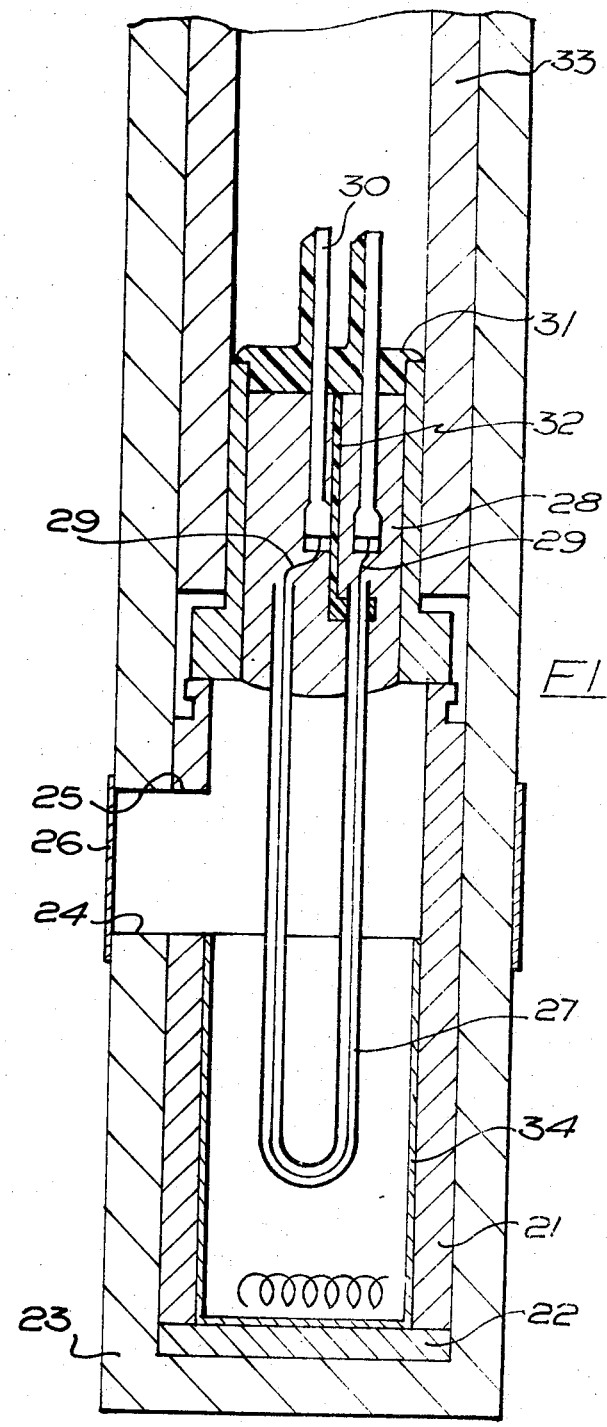

LANCES FOR TAKING SAMPLES OF MOLTEN METAL

This invention relates to lances for taking samples of molten metal and is particularly concerned with the provision of a lance not only capable of taking the sample but also capable of indicating the liquidus arrest temperature of the sample.

The introduction of the basic oxygen processes with very high refining rates of several tons per minute has brought about the need for quicker and more reliable methods of analysis for steel. Present techniques involve obtaining a sample of molten metal from the furnace in a long-handled spoon. The sample is poured into a mould, where it is chilled; the ingot formed is sectioned for spectrographic-analaysis. Techniques are known for obtaining samples from the molten bath by means of sampling lances, the samples obtained being used for spectrographic or combustion analysis. Also known are expendable devices for measuring the carbon content of a sample of steel by detection of the liquidus arrest temperature associates with the phase change as the sample of molten metal solidifies.

Lances able to detect the liquidus arrest temperature normally incorporate refractory moulds or metal moulds for immersion in the molten metal bath to obtain samples suitable for measurement of the liquidus arrest temperature. The method of use of these devices is to immerse the lance into the molten metal bath, whereupon a molten sample is obtained. Of the refractory materials available for refractory moulds, some have a very poor thermal-conductivity and produce only a very slow chilling of the sample. The lance must be withdrawn from the bath in order for the sample to freeze and enable the liquidus arrest temperature to be measured. Such methods are at the disadvantage that unless the lance is withdrawn very carefully from the bath, much of the molten sample can be lost during the extraction process. Any device which relies upon the action of an operator to enable a reading to be obtained is subject to operator error.

Other refractories, however, can have fairly high thermal properties and can produce a chilling rate comparable to that of many metal moulds with resultant solidification of the sample while the mould is immersed in the molten metal. However, monolithic refractory moulds having properties comparable to metal moulds, and metal moulds themselves, have the disadvantage that the rate of heat-removal is highest at time zero, and decreases as time increases. This being so, much of the heat is removed from the sample in the first two seconds that the sample is within the mould, and as temperature-sensing units take at least that length of time to respond, the result is that a very poor trace of temperature loss is obtained, it being the trace from which is derived the liquidus arrest temperature from which, in turn, is determined the carbon content. This problem is magnified when using small sample chambers, because of the smaller amount of heat to be extracted.

According to the present invention, a lance for taking a sample of molten metal comprises an outer-housing or elongated holder tube, a mould set at one end of the housing or holder tube, there being at least one slot in the housing or holder tube adjacent a slot in the metal mould to allow molten metal to flow into the mould when the lance is immersed in molten metal, a refractory lining to the mould and temperature sensing means within the mould adapted to record the liquidus arrest temperature of the sample within the mould. The mould may be a metal mould or a mould of refractory material having similar temperature dulling properties as a metal mould. Alternatively the housing may itself constitute the mould.

Thus, as distinct from existing refractory moulds which necessitate withdrawal of the lance to allow the sample to freeze and existing metal or refractory moulds which cause an initial chilling which is far too fast, the metal mould with a refractory lining brings about freezing or solidifying of the sample within the mould at a rate that is desirable to enable the temperature-sensing means to accurately detect the liquidus arrest temperature and thereby enabling an accurate analysis to be made of the carbon content of the steel. A typical example of freezing rate is that it freezes within five to thirty seconds of entering the mould, and the lance need not be removed from the mass of molten metal.

The refractory lining may be a bonded alumina-cement but preferably it is a thin preformed ceramic liner of, e.g., refractory paper composed of alumino-silicate fibers.

The temperature-sensing means may be secured at any desired point within the mould but preferably it is set at the bottom of the mould in the form of a U-tube of quartz or silica within which is a thermocouple element of e.g., platinum/rhodium-platinum.

The housing or holder tube is preferably of a material of poor thermal conductivity. Thus, it may be paper, cardboard, bonded refractory paper or simply a refractory tube. The inlet ports or each slot in the holder tube may be initially closed by, for example, one or more layers of papers or by a sheath of aluminium or mild steel to prevent the ingress of slag into the mould as the device is plunged through the slag layer into the molten metal. The paper, aluminium or mild steel, burns or melts away to allow the molten metal to pass through the slots to the mould. The holder tube may be long enough to enable insertion of the mould into a molten bath, or the housing may be of a length to contain the mould when there would be an extension beyond the housing to enable it to be secured to a basic oxygen furnace secondary lance.

It may be desirable to protect the thermocouple from the initial surge of molten metal entering the mould. Thus, the quartz or silica tube may be cemented into a metallic or refractory housing which is pushed into an aluminium tube, the whole assembly being located within the mould. To provide the electrical connection between the thermocouple and a recording device, a metal lance may be provided within the insulating holder tube, there being leads extending from the thermocouple along the inside of the metal tube to the recording device remote from the lance.

If the device is intended to sample molten steel, a quantity of aluminium may be provided within the metal mould sufficient to combine with the oxygen present in the sample taken from the bath. The aluminium may be in any suitable form, e.g., foil, gauze, or wire, or it may be provided by the protection case for the thermocouple.

With the device assemblied for use, it is simply plunged into the molten metal and held there for a maximum of thirty seconds by which time the liquidus arrest temperature has been accurately obtained. The device is then withdrawn from the bath and, if required, the sample extracted from within the mould for spectrographic or other forms of analysis.

The device may be modified by the addition of second temperature-sensing means in such a position as to ensure the bath temperature when the device is plunged into the molten metal.

Figure 2:
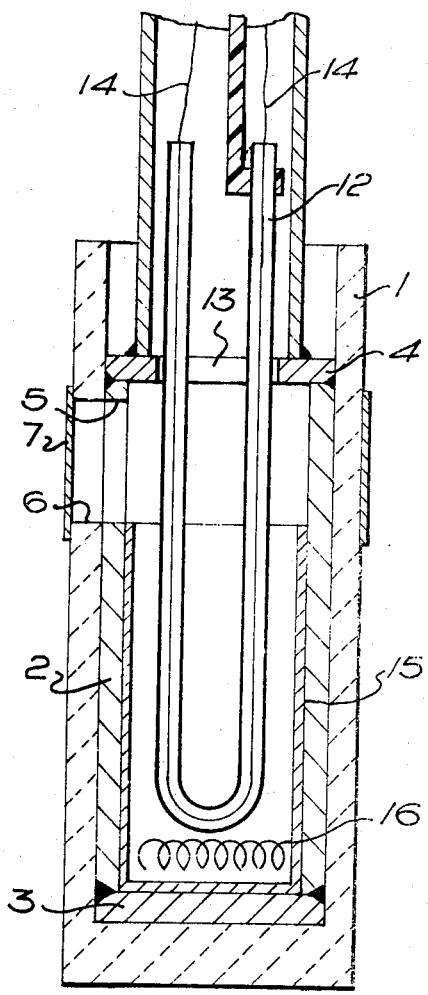
Figure 2:
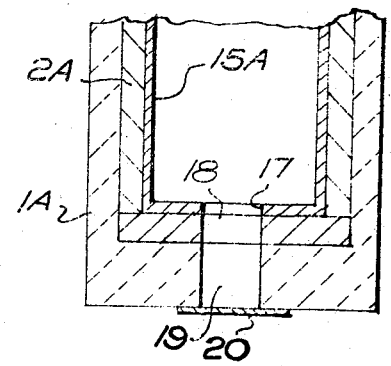

Two embodiments of the invention will now be described with reference to the accompanying drawings in which:

FIG. 1 is a sectional side elevation of one embodiment of sampling device according to the invention;

FIG. 2 corresponds to part of FIG. 1 but shows a slight modification; and

FIG. 3 corresponds to FIG. 1 but shows a second embodiment of sampling device.

In FIG. 1 a sampling device has an insulating outer housing 1 formed, for example, of bonded alumino-silicate fiber, housing a mild steel mould 2 formed as a tubular mild steel body having a bottom cap 3 and a top cap 4 welded to it. The metal mould has an inlet port 5, and the outer housing 1 has a corresponding port 6 closed by a paper inlet cover 7. A tubular mild steel extension 8 is welded to the top cap 4, the upper end of the extension being closed by a plastics cap 9 in which are embedded two copper contacts 10. Extending downwardly from the cap 9 is a support 11 for a silica U-tube 12 of a thermocouple which extends through the hole 13 in the top cap 4 and down into the interior of the metal mould. Leads 14 extend from the ends of the U-tube to the copper contacts 10.

Within the metal mould is a lining 15 of alumino-silicate paper and in the bottom of the mould is a small amount of aluminium 16 for the purpose of de-oxidizing the sample.

Thus, with the sampling device secured in the end of a basic oxygen furnace secondary lance (not shown) the device is simply plunged into the molten metal and held there for a maximum of 30 seconds. The paper inlet cover prevents slag from entering the mould and quickly burns away on reaching the molten metal. The molten metal thus flows into the mould, is killed by the aluminium, and before it has been withdrawn, the liquidus arrest temperature has been accurately obtained. The device is then withdrawn from the bath, and if required, the sample extracted from the mould for spectrographic or other forms of analysis.

As a very slight modification of the sampling device of FIG. 1, the device may be adapted to allow molten metal to flow in from the bottom of the mould in addition to through the entry port 5. Thus, as is shown in FIG. 2, the metal mould 2A, the paper liner 15A, and the insulating outer housing 1A have corresponding holes 17, 18, and 19, respectively, the hole in the outer housing being closed by a paper cover 20. On plunging of the device into the bath, the paper covering 20 again prevents slag from entering the mould and burns away on reaching the molten metal.

In an alternative construction shown in FIG. 3, a metal mould 21 closed at one end by a cap 22 is mounted in the end of a holder tube 23 of poor thermal conductivity which may be, for example, of a suitably impregnated cardboard, bonded refractory paper, or simply a refractory tube. The holder tube has an inlet port 24 cooperating with an inlet port 25 to the mould and closed by a layer 26 of paper or aluminium. The quartz or silica tube 27 of a thermocouple is cemented into a refractory housing 28, the leads 29 from the thermocouple extending to copper contacts 30 also embedded in the housing. The housing is closed at its upper end by a plastics cap 31 having a downwardly extending support arm 32 for the quartz or silica tube. The holder tube is of a length sufficient to permit the insertion of a metallic lance 33, itself of a length to permit the device to be plunged into a molten bath. Again an amount of aluminium may be contained in the bottom of the mould to kill the steel forming the sample or, alternatively, a tubular aluminium shield may be secured to the housing 28 of a length to extend beyond the inlet port 25 to serve the double purpose of killing the steel and preventing the quartz or silica tube from being damaged by the initial surge of molten metal into the mould. The metal mould again has a liner 34 of alumino-silicate paper.

In use, the device of FIG. 3 is used in much the same way as FIG. 1, it being simply plunged into the molten bath and held there for approximately 30 seconds by when the sample has been formed and the liquidus arrest temperature accurately determined.

The device of both embodiments can be modified, if required, by the addition of a second temperature-sensing means, suitably positioned, to determine the bath temperature when the device is plunged into the molten metal.

What I claim is:

1. A multilayer lance for taking a sample of molten metal comprising an outer housing tube having thermal properties of a heat insulator, a metal mold set at one end of the housing tube, there being at least one opening in the housing tube and an adjacent opening in the mold to allow molten metal to flow into the mold when the lance is immersed in molten metal, a refractory lining to the mold, and temperature-sensing means within the mold adapted to record the liquidus arrest temperature of the sample within the mold.

2. A multi-layer lance for taking a sample of molten metal comprising an outer housing tube having thermal properties of a heat insulator, a mold of relatively non-insulating material compared to said housing tube set at one end of the housing tube, and a thin, preformed liner of refractor paper for said mold comprising alumino-silicate fibers, there being at least one opening in the housing tube and an adjacent opening in the mold to allow molten metal to flow into the mold when the lance is immersed in molten metal, and a temperature sensing means within the mold adapted to record the liquidus arrest temperature of the sample within the mold.

* * * * *